H. W. SHONNARD.
GYROSCOPIC STEERING MECHANISM.
APPLICATION FILED MAY 25, 1917.
1,296,330.
Patented Mar. 4, 1919.
3 SHEETS—SHEET 1.
FIG. 1.
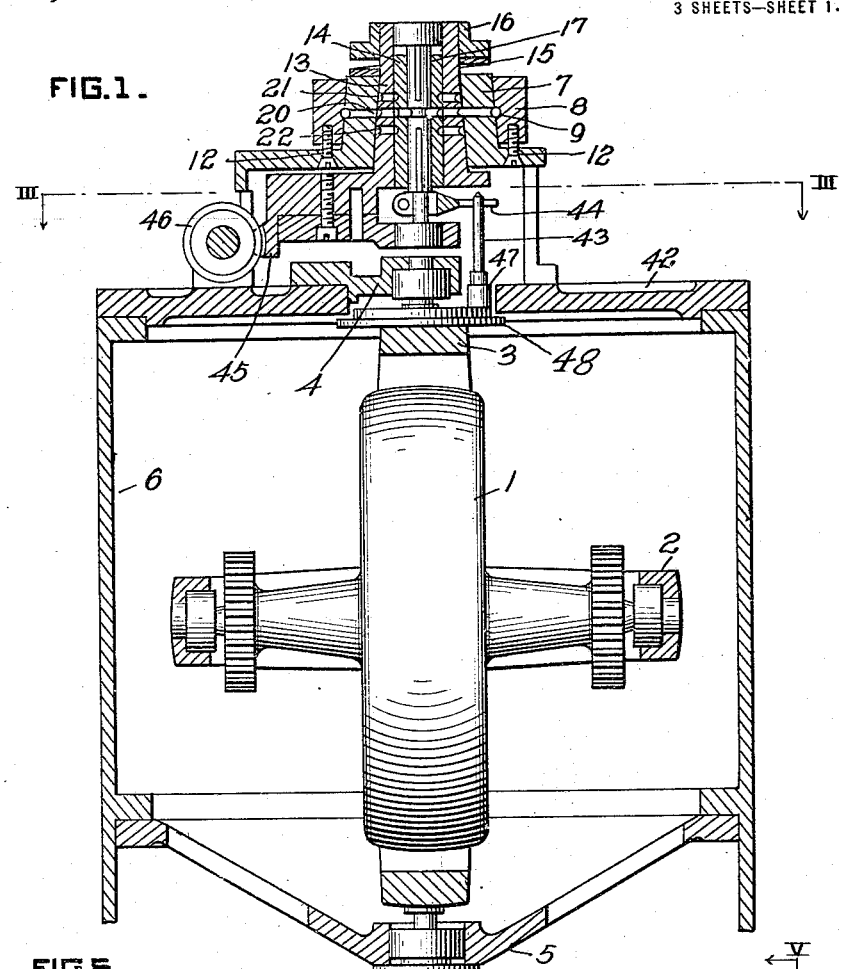
FIG. 5.
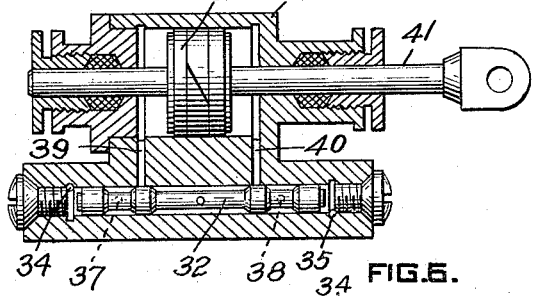
FIG. 6.
FIG. 4.
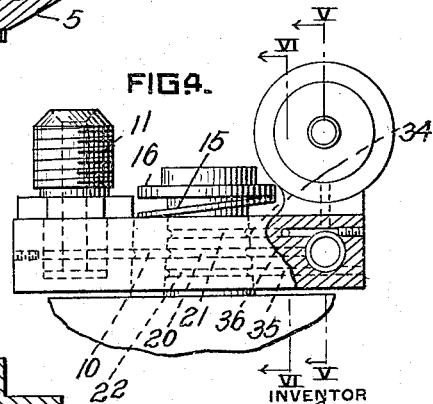
WITNESSES
INVENTOR
Harold W. Shonnard
by Christy and Christy
his Attorneys

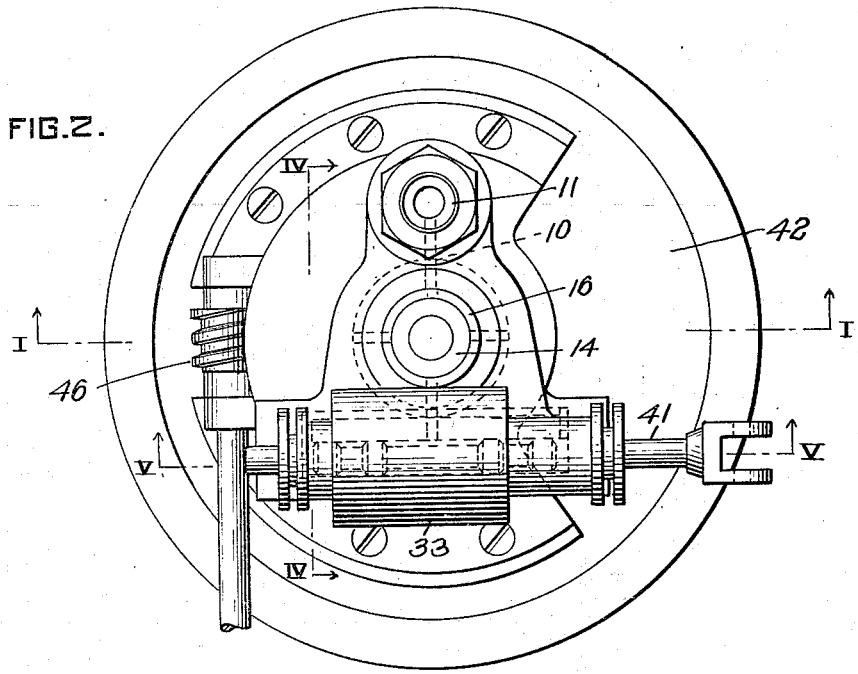
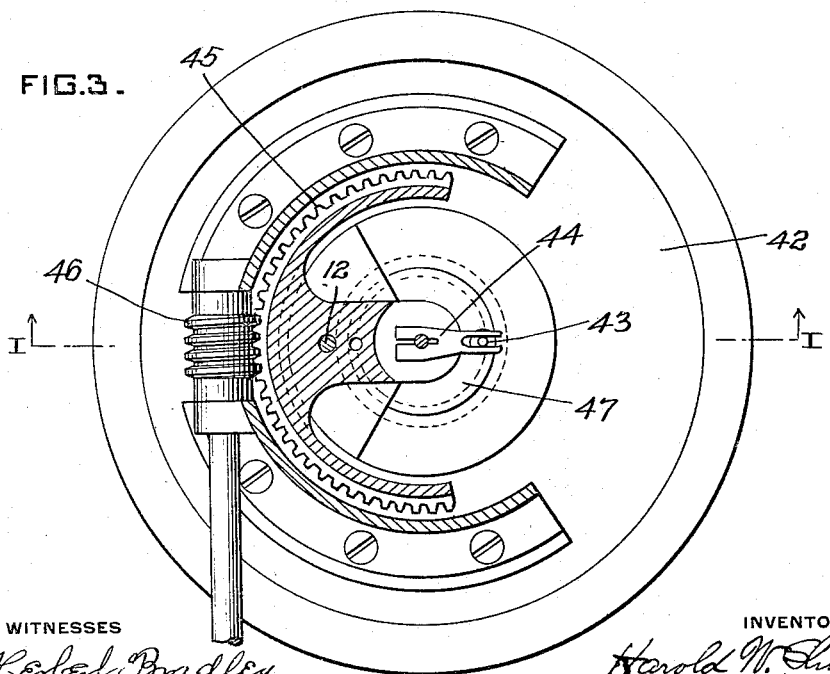

H. W. SHONNARD.
GYROSCOPIC STEERING MECHANISM.
APPLICATION FILED MAY 25, 1917.
1,296,330.
Patented Mar. 4, 1919.
3 SHEETS—SHEET 3.
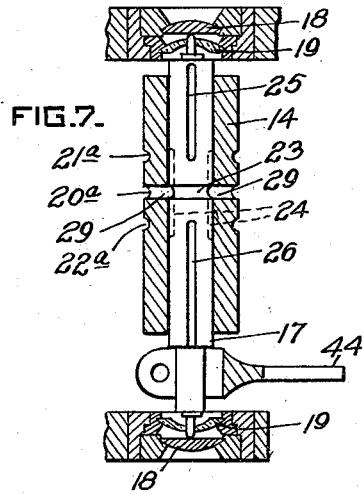
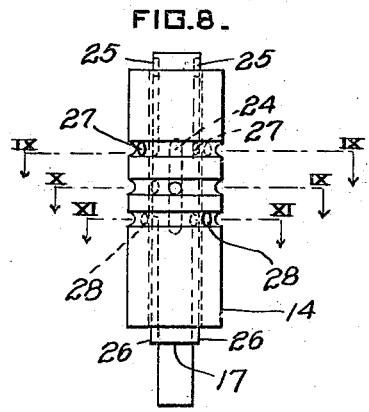
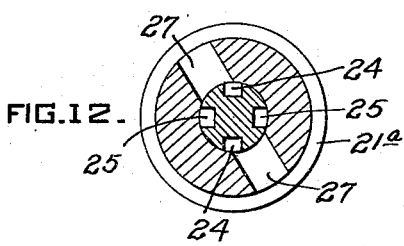
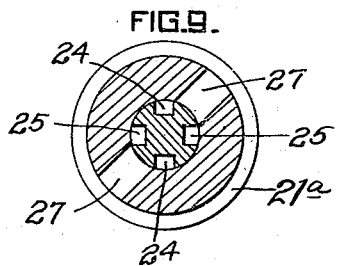
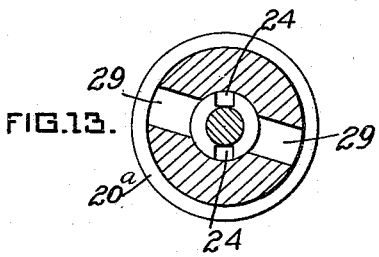
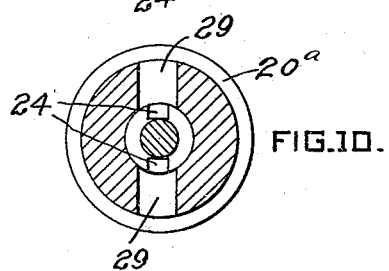
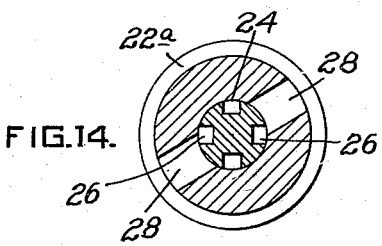
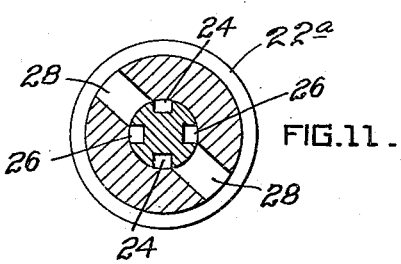
WITNESSES
J. Herbert Bradley.
Francis J. Tomasson.
INVENTOR
Harold W. Shonnard
by Christy and Christy
his Attorneys

UNITED STATES PATENT OFFICE.

HAROLD W. SHONNARD, OF UPPER MONTCLAIR, NEW JERSEY, ASSIGNOR TO CRUCIBLE STEEL COMPANY OF AMERICA, OF PITTSBURGH, PENNSYLVANIA, A CORPORATION OF NEW JERSEY.

GYROSCOPIC STEERING MECHANISM.

1,296,330.   Specification of Letters Patent.   Patented Mar. 4, 1919.

Application filed May 25, 1917.   Serial No. 171,045.

*To all whom it may concern:*

Be it known that I, HAROLD W. SHONNARD, residing at Upper Montclair, in the county of Essex and State of New Jersey, a citizen of the United States, have invented or discovered certain new and useful Improvements in Gyroscopic Steering Mechanism, of which improvements the following is a specification.

My invention relates to gyroscopes for controlling automobile torpedoes, aeroplanes, and similar self propelled vessels having gyroscopically controlled steering mechanism. The object is to improve the construction and arrangement of the valve mechanism which, through the relative movements of the gyroscope rotor and support, controls the flow of air or other motive fluid to the steering engine, the improvements being to the end that there may be greater freedom of movement of the valve, that jets of air from the valve may not impinge upon and destroy the balance of the gyroscope, and that angle fire adjustments may be simple in construction and accurate in operation.

In the accompanying sheets of drawings, which form part of my specification, I have illustrated the preferred embodiment of my invention. Figure 1 is a vertical sectional view of the gyroscope, the plane of view being indicated by the lines I—I, Figs. 2 and 3; Fig. 2 a plan view of the gyroscope; Fig. 3 a combined section and plan view, taken on the line III—III, Fig. 1; Fig. 4 a combined detail elevation and sectional view taken on the line IV—IV, Fig. 2; Fig. 5 a sectional view taken on the lines V—V, Figs. 2 and 4; Fig. 6 a detail sectional view taken on the line VI—VI, Fig. 4; Fig. 7 an enlarged vertical sectional view of the controlling valve and mounting therefor; Fig. 8 a side view of the valve; Figs. 9, 10 and 11 sectional views taken on the line IX—IX, X—X and XI—XI, Fig. 8, showing the arrangement of ports when the valve stem and casing are in normal operating positions; and Figs. 12, 13 and 14 views corresponding, respectively, with Figs. 9, 10 and 11, but showing the port arrangements when the valve is adjusted for angle fire.

As far as my present invention is concerned, the gyroscope in itself may be of any desired type or construction, and may be locked, spun, unlocked and otherwise controlled or operated in any well known or desired manner. As illustrated herein, it comprises a rotor or fly-wheel 1 adapted to be spun mechanically, a horizontal or inner gimbal 2 in which the rotor is pivotally mounted, and a vertical or outer gimbal 3 in which the horizontal gimbal is pivotally mounted. The gyroscope as a whole is, through the outer gimbal 3, pivotally mounted in oppositely disposed supporting members 4 and 5 secured to a frame or housing 6.

The valve provided for controlling the flow of motive fluid is, in its general construction and arrangement, of a well known type comprising an outer casing, a ported indexing sleeve rotatably mounted within the casing, and a ported spindle rotatably mounted within such sleeve. In the illustrative embodiment of the invention the casing is formed of two parts, an inner conically bored member 7 and an outer ring 8 attached to each other by screws 12, between which parts there is formed a passageway 9 communicating through a port 10 and connecting plug 11 with a source of motive fluid supply, Figs. 2 and 4. The indexing sleeve is also preferably formed of two parts, an outer conical portion 13, adapted to fit into the casing member 7, and a bushing 14 extended to fit tightly within the portion 13, the sleeve 13, 14 being held yieldingly within the casing member 7 by means of a spring 15 which exerts its pressure upon the top of the casing and beneath a nut 16 secured to the sleeve. The ported spindle 17 is of slightly smaller outer diameter than the inner diameter of the bushing 14, and, that the spindle may be accurately centered within the bushing and thus offer a minimum resistance to its rotation in response to the movements of the gyroscope, it is mounted in jewel bearings, preferably in the manner particularly illustrated in Fig. 7. As there shown, each bearing comprises a thrust or end jewel 18 and a centering or perforate disk jewel 19, and both bearings are supported one at each end of the sleeve members 13.

The valve members may be provided with various arrangements of ports to the end that motive fluid may be simultaneously directed and exhausted from the steering engine. In the valve shown herein, the outer face of the sleeve member 13 is provided with three annular grooves 20, 21 and 22, each of which communicate directly, as indicated in Fig. 1, with corresponding annular grooves 20$^a$, 21$^a$ and 22$^a$ formed in the outer face of the bushing 14. An annular groove 23 is formed on the spindle 17 at the central portion thereof, and is in continuous communication with the groove 20$^a$ by means of ports 29. It will be seen that, through the grooves 20 and 20$^a$ and the indicated transverse connecting ports, the spindle groove 23 is in continuous communication with the passageway 9 of the casing 7, 8, and, through such passageway, with the source of fluid supply. The grooves 21$^a$ and 22$^a$ are through connections presently to be explained, in continuous communication with the steering engine, and the spindle 17 is provided with three pairs of longitudinally disposed vents 24, 25 and 26, the members of each pair being, for the sake of balance, diametrically arranged on opposite sides of the spindle. The vents 24 are at the central portion of the spindle, and, at their opposite ends, they communicate with the grooves 21$^a$ and 22$^a$ through ports 27 and 28, respectively, in the bushing 14. Thus, depending upon the angular position of the spindle within the sleeve bushing, the vents 24 are adapted to place one or the other of said grooves in communication with the source of fluid supply. The vents 25 and 26, extending respectively, to the upper and lower ends of the spindle, are exhaust vents, the vents 25 communicating through ports 27 with the groove 21$^a$, and the vents 26 through ports 28 with the groove 22$^a$.

In Figs. 9, 10 and 11 there is indicated to enlarged scale the relative locations of vents and ports when the spindle 17 is at a neutral position, that is to say when there is not free passage for flow either to or from the steering engine. In such position it will be observed that the outer ends of the vents 24 and the inner ends of the vents 25 and 26 are closed against communication with the ports 27 and 28, and that a slight rotary movement of the spindle 17 in a right hand direction, as viewed in these figures, will open the vents 26 to exhaust through ports 28, and the vents 24 to supply through ports 27. Thus the portion of the steering engine in communication with groove 22$^a$ will be open to exhaust and the portion in communication with the groove 21 will be open to supply. The opposite movement of the spindle will effect the reverse flow of motive fluid.

In Figs. 12, 13, and 14 there is, in a manner similar to Figs. 9, 10 and 11, shown the relative locations of the several vents and ports when the indexing sleeve 13, 14 has been turned in a left hand direction through an arc of approximately 75° for angle fire. In this position it will be seen that the groove 21$^a$ is, through ports 27 and vents 24, open to supply, and the groove 22$^a$ is, through ports 28 and vents 26 open to exhaust, and that the ports and vents will remain open for such flow until, through the relative movement between the gyroscope and its supporting body, the spindle 17 will have moved in a left hand direction through an arc of about 75°.

While any suitable form of steering engine may be used, I preferably use one of the general type illustrated particularly in Fig. 12 of my U. S. Patent No. 1,030,134, which engine includes a secondary valve for controlling the piston. As shown in Figs. 4, 5 and 6 of my present application the engine piston 31 and secondary valve 32 are inclosed in a casing 33 mounted adjacent to the controlling valve just explained. Fluid passageways 34 and 35 extend respectively from the grooves 21 and 22 of the indexing sleeve to the opposite ends of the valve 32, and the central portion of such valve is, through groove 20 and a passageway 36, in continuous communication with the source of motive fluid supply. The casing 33 is further provided with exhaust ports 37 and 38, and with passageways 39 and 40 extending from the valve chamber to opposite sides of the piston 31. As shown in Fig. 5, the valve 32 is in a central or neutral position, a position which in practice it would seldom, if ever, occupy. Assuming the controlling valve to be in the position indicated in Figs. 9, 10 and 11, the turning of the spindle 17 in a right hand direction will cause motive fluid to flow to the right end of the valve 32 (Fig. 5), and will open the left end of such valve to exhaust. This will cause the valve 32 to move to the left and thereby permit the flow of motive fluid through passageway 39 to the left end of the piston 31, and from the right end of the piston through the passageway 40 to the exhaust port 38. The reverse movement of the spindle 17 will, of course, cause the valve to move to the opposite end of the casing and cause a reverse flow to and from the piston cylinder. It will be understood that the piston rod 41 of the steering engine may be attached in any desired manner to a rudder or other guiding member of a torpedo, aeroplane, etc.

While as far as some features of my invention are concerned, the valve for controlling the flow of motive fluid to the steering engine may be mounted in any desired manner, and in any suitable position with relation to the gyroscope, it is, as indicated herein, preferably mounted on a plate 42 forming part of the housing 6, and in such position that the axes of rotation of the spindle 17 and the indexing sleeve 13, 14 are coincident with the pivot axis of the gyroscope. Among the various advantages arising from such positioning of the axes of rotation are, first, freedom of movement of the valve parts, secondly. simplicity of the connections for effecting such movements, and thirdly, the simplicity of the arrangement of valve ports and vents.

The connections between the gyroscope and valve spindle 17 for causing the latter to rotate in response to the movements of the former preferably comprise a pin 43 secured eccentrically to the outer gimbal 3 of the gyroscope, and a slotted lever 44 clamped to the spindle 17. As will be seen, the turning of the gyroscope with relation to its support will cause a corresponding and equal turning of the spindle, so that, in constructing the valve, it becomes unnecessary to space the ports and vents in a fractional ratio to the contemplated range of rotation of the gyroscope.

The rotation of the indexing sleeve 13, 14 is preferably effected by means of a worm gear comprising a segmental worm wheel 45 secured to or formed as a part of the sleeve member 14, and a worm shaft 46 mounted on the plate 42. The sleeve, being held yieldingly within the conically bored casing 7 by means of the spring 15, is free to be accurately rotated to any desired angular position with relation to the gyroscope.

A further feature of my invention has to do with means for preventing jets of air or other motive fluid, which, in the operation of the mechanism issue from the controlling valve and steering engine, from impinging upon the gyroscope in such manner as to cause it to precess. For this purpose the plate 42 and its attached gyroscope-supporting member 4 form a partition between the gyroscope and said valve and engine. The partition, however, is provided with an arc-shaped slot 47 through which the pin 43 extends and may move. To deflect laterally from the gyoscope such jets of fluid as may pass through this slot, the gyroscope gimbal is provided with a transversely extending baffle plate 48, as shown in Fig. 1.

According to the provisions of the patent statutes, I have described the principle and operation of my invention together with the mechanism which I now consider to represent the best embodiment thereof. However, I desire to have it understood that my invention may be practised with other forms of mechanism than that particularly shown and described.

I claim as my invention:

1. In a gyroscopic steering mechanism, the combination of a pivotally mounted gyroscope, a fluid pressure steering engine, a valve for controlling motive fluid for said engine, said valve comprising an outer fixed casing, a ported indexing sleeve and a ported spindle each rotatably mounted on an axis coincident with the pivot axis of said gyroscope, means for rotating said sleeve relatively to said spindle, and connections between said spindle and gyroscope for rotating the former in response to the movements of the latter.

2. In a gyroscopic steering mechanism, the combination of a pivotally mounted gyroscope, a fluid pressure steering engine, a valve for controlling motive fluid for said engine, said valve comprising an outer fixed casing, a ported indexing sleeve and a ported spindle each rotatably mounted on an axis coincident with the pivot axis of said gyroscope, a worm gear for rotating said sleeve relatively to said spindle, and connections including a pin attached to the gyroscope and a lever attached to said spindle for rotating the latter in response to the movements of the former.

3. In a gyroscopic steering mechanism, the combination of a pivotally mounted gyroscope, a fluid pressure steering engine, a valve for controlling motive fluid for said engine, said valve comprising an outer fixed casing, a ported indexing sleeve and a ported spindle each rotatably mounted on an axis parallel with the pivot axis of said gyroscope, said sleeve being provided with a laterally extending segmental worm wheel, a worm shaft associated with said worm wheel for indexing said sleeve, and connections between said spindle and gyroscope for rotating the former in response to the movements of the latter.

4. In a gyroscopic steering mechanism, the combination of a pivotally mounted gyroscope, a fluid pressure steering engine, a ported valve for controlling motive fluid for said engine, connections between said gyroscope and valve for operating the latter in response to the movements of the former, and a baffle between said valve and said gyroscope for deflecting laterally of the gyroscope jets of motive fluid issuing from the valve.

5. In a gyroscopic steering mechanism, the combination of a pivotally mounted gyroscope, a fluid pressure steering engine, a ported valve for controlling motive fluid for said engine, a plate extending transversely of the pivot axis of the gyroscope affording a support for said valve and provided with an opening therethrough, connections between said gyroscope and valve and extending through the opening in said plate for operating the valve in response to the movements of the gyroscope, and a baffle attached to the gyroscope for deflecting laterally of the gyroscope jets of motive fluid issuing from the valve.

6. In a gyroscopic steering mechanism, the combination of a pivotally mounted gyroscope, a fluid pressure steering engine, a valve for controlling motive fluid for said engine, said valve comprising an outer conically bored casing, a conical ported sleeve rotatably mounted in said casing, and a ported spindle rotatably mounted within said sleeve; a spring acting between said casing and sleeve to hold the latter within the former, means for rotating said sleeve, and connections between said spindle and gyroscope for rotating the former in response to the movements of the latter.

In testimony whereof I have hereunto set my hand.

HAROLD W. SHONNARD.

Witnesses:
GEO. V. JAMES,
HERMAN C. ENGELMAN.

Copies of this patent may be obtained for five cents each, by addressing the "Commissioner of Patents, Washington, D. C."